United States Patent
Lee et al.

(10) Patent No.: US 10,146,730 B2
(45) Date of Patent: Dec. 4, 2018

(54) DEVICE FOR MAINTAINING SERIAL ROUTING DURING REQUEST TRANSMISSION AND METHOD THEREOF

(71) Applicant: MOXA INC., New Taipei (TW)

(72) Inventors: Tsung-Hsien Lee, New Taipei (TW); Chien-Ho Wang, New Taipei (TW); Chih-Hung Yu, New Taipei (TW)

(73) Assignee: MOXA INC., New Taipei (TW)

( * ) Notice: Subject to any disclaimer, the term of this patent is extended or adjusted under 35 U.S.C. 154(b) by 37 days.

(21) Appl. No.: 15/641,249

(22) Filed: Jul. 4, 2017

(65) Prior Publication Data

US 2018/0307649 A1   Oct. 25, 2018

(30) Foreign Application Priority Data

Apr. 20, 2017  (TW) .............................. 106113230 A (51) Int. Cl.
  *G06F 13/10*  (2006.01)
  *G06F 13/42*  (2006.01)
  *G06F 13/36*  (2006.01)
  *G06F 13/40*  (2006.01)

(52) U.S. Cl.
  CPC .......... *G06F 13/4282* (2013.01); *G06F 13/36* (2013.01); *G06F 13/4068* (2013.01)

(58) Field of Classification Search
  None
  See application file for complete search history.

(56) References Cited

U.S. PATENT DOCUMENTS

| | | | |
|---|---|---|---|
| 6,621,820 B1 * | 9/2003 | Williams | H04L 45/00 370/395.31 |
| 7,433,356 B2 * | 10/2008 | Jain | H04L 29/1232 370/392 |
| 8,693,370 B2 * | 4/2014 | Wu | H04L 12/437 370/218 |
| 8,775,590 B2 * | 7/2014 | Devarakonda | H04L 43/0817 709/223 |
| 9,026,706 B2 * | 5/2015 | Channagiri Nagendra | G06F 13/4063 710/300 |
| 9,411,768 B2 * | 8/2016 | Huang | H04N 21/43635 |
| 9,455,785 B2 * | 9/2016 | Boyd | H04L 12/2801 |

* cited by examiner

*Primary Examiner* — Cheng Yuan Tseng
(74) *Attorney, Agent, or Firm* — Chih Feng Yeh; Huntington IP Consulting Co., Ltd.

(57) ABSTRACT

The present disclosure illustrates a device for maintaining serial routing during request transmission and a method thereof. According to an embodiment, the device may select one of serial ports according to a routing rule to transmit a request. When not receiving the response, the corresponding routing data is deleted from the routing rule, and the device transmits the request through all serial ports, and upon receipt of the response, the device adds a piece of corresponding transaction data in the routing rule. As a result, the routing rule may be automatically updated when a new serial device is electrically connected to the gateway or the serial port through which the serial device is electrically connected to the gateway is changed. The technical effect that it is not necessary for the user to particularly set the gateway after installation may be achieved.

12 Claims, 5 Drawing Sheets

| serial port identification data | device identification data |
|---|---|
| 1 | 1 |
| 3 | 2, 3 |
| | |
| | |

| serial port identification data | device identification data |
|---|---|
| 1 | 1 |
| 3 | 3 |
| | |
| | |

| serial port identification data | device identification data |
|---|---|
| 1 | 1 |
| 3 | 3 |
| 2 | 2 |
| | |

DEVICE FOR MAINTAINING SERIAL ROUTING DURING REQUEST TRANSMISSION AND METHOD THEREOF

CROSS-REFERENCE TO RELATED APPLICATIONS

The application is a counterpart foreign application of Ser. No. 106113230, filed on Apr. 20, 2017, which is herein incorporated by reference in its entirety.

BACKGROUND

1. Technical Field

The present disclosure relates to a device for forwarding request and a method thereof, and more particularly to a device for maintaining serial routing during request transmission, and a method thereof.

2. Related Arts

In development process of fieldbus technology, serial-based fieldbus protocol (such as Profibus protocol, or Modbus RTU/ASCII protocol) is applied in industry earlier; furthermore, because the serial-based fieldbus protocol is less complicated than other fieldbus protocol used later, now there are still many existing serial devices supportable to the serial-based fieldbus protocol only. However, physical circuit characteristic of serial port of the serial device is unable to perform long-distance transmission, so a repeater is required to extend the transmission distance, but the repeater may result in increasing of cabling cost.

In order to solve the problem of increased cabling cost, some factories use two gateways to electrically connect to the serial devices respectively at remote end and local end, each gateway is configured for conversion of the serial port to a network port, (that is, each gateway is supportable to the serial-based fieldbus protocol), and the two gateways are in communication with each other through Ethernet, thereby saving the long-distance cabling cost.

However, when the gateway is used for conversion of the serial port to the network port, the user must manually set a routing rule on the gateway for all serial devices electrically connected to the gateway, to enable the gateway to correctly forward a communication packet, which is transmitted from network end, to one of serial ports according to the routing rule. However, when a new serial device is electrically connected to the gateway or the serial device originally connected to a serial port of the gateway is changed to connect to other serial port of the gateway, the user must update the routing rule; otherwise, the new serial device or the serial device connected to the other serial port is unable to transmit and receive data correctly.

The conventional technology has the problem that the user must manually update the routing rule when a new serial device is connected to gateway or the serial device is re-connect to different serial port of the gateway, otherwise the serial device is unable to transmit and receive data correctly. Therefore, what is need is to develop an improved technical means to solve the problem.

SUMMARY

In order to solve aforementioned problem that, when a new serial device is added to connect to the gateway or the serial device is re-connect to different serial port of the gateway, the routing rule must be updated manually to prevent that the new serial device or changed the serial device is unable to transmit and receive data correctly, the present disclosure is to provide a device for maintaining serial routing during request transmission, and a method thereof.

According to an embodiment, the present disclosure provides a device for maintaining serial routing during request transmission, and the device includes a main port, a plurality of serial ports, a storage module and a processing module. The main port is electrically connected to a main device, and configured to receive a request transmitted from the main device. The request includes device identification data. Each of the plurality of serial ports corresponds to a piece of serial port identification data. The storage module is configured to store a routing rule. The processing module is electrically connected to the main port, the plurality of serial ports and the storage module, and configured to determine whether the piece of serial port identification data corresponding to the device identification data exists based on the routing rule. When the piece of serial port identification data exists in the routing rule, the processing module transmits the request through the serial port corresponding to the piece of serial port identification data and waits for a response, and when the processing module does not receive the response after a predetermined period, the processing module deletes a piece of routing data indicative of a corresponding relationship between the device identification data and the piece of serial port identification data, from the routing rule. When the piece of serial port identification data does not exist in the routing rule, the processing module transmits the request through the plurality of serial ports respectively and waits for the response; and when the processing module receives the response, the processing module adds a piece of transaction data indicative of the corresponding relationship between the device identification data and other piece of serial port identification data, in the routing rule. The other piece of serial port identification data corresponds to one of the plurality of serial ports which receives the response.

According to an embodiment, the present disclosure provides a method for maintaining a serial routing during request transmission. The method is applicable to a gateway including a plurality of serial ports, and the method includes following steps: receiving a request which comprises device identification data; determining whether serial port identification data corresponding to the device identification data exists based on a routing rule; under a condition that the serial port identification data exists in the routing rule, transmitting the request through one of plurality of serial ports corresponding to the serial port identification data, and waiting for a response, and then deleting a piece of routing data indicative of a corresponding relationship between the device identification data and the serial port identification data, from the routing rule when the response is not received after a predetermined period; and under a condition that the serial port identification data does not exist in the routing rule, transmitting the request through all of the plurality of serial ports respectively and waiting for the response, and then adding a piece of transaction data indicative of a corresponding relationship between the device identification data and other serial port identification data, in the routing rule when the response is received, wherein the other serial port identification data corresponds to the serial port receiving the response.

According aforementioned content, the difference between the present disclosure and the conventional technology is that the gateway of the present disclosure may delete the corresponding routing data then transmit the request through all serial ports when the gateway has transmitted the request according to the routing rule but did not receive the response, and then add the corresponding transaction data in the routing rule, thereby solving the conventional technology problem and achieving the technical effect that it is not necessary for the user to particularly set the gateway after installation.

BRIEF DESCRIPTION OF THE DRAWINGS

The structure, operating principle and effects of the present disclosure will be described in detail by way of various embodiments which are illustrated in the accompanying drawings.

DETAILED DESCRIPTION

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

According to technology of the present disclosure, the gateway may update routing rule dynamically every time the gateway receives a request, so that the gateway may automatically select one of serial ports according to the dynamically-updated routing rule, so as to forward the request to a correct slave device.

Figure 1A:
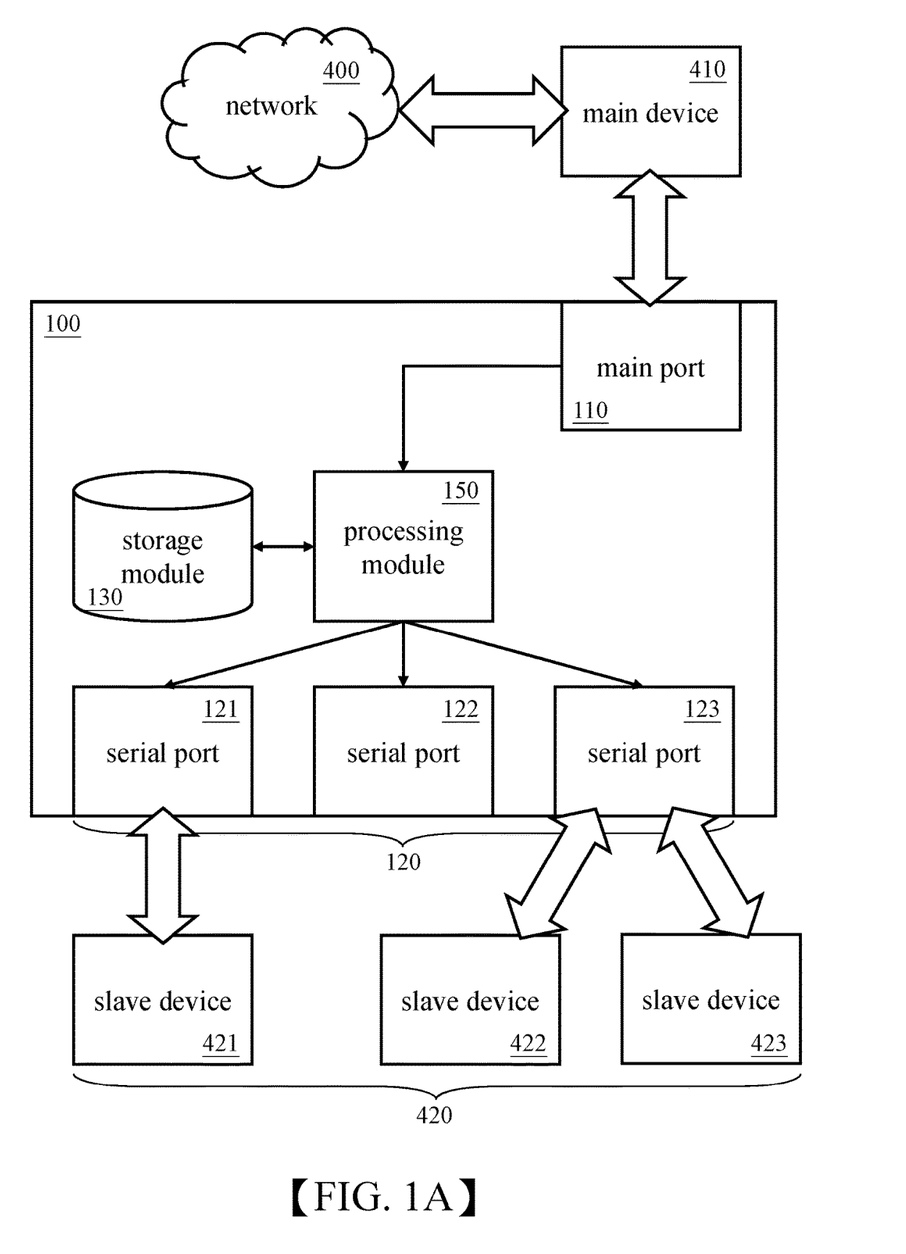
FIG. 1A is a schematic view of an embodiment of a device for maintaining serial routing during request transmission, in accordance with the present disclosure.

The following refers to FIG. 1A, which is schematic view of an embodiment of a device for maintaining serial routing during request transmission in accordance with the present disclosure, to illustrate operation of the present disclosure. As shown in FIG. 1A, the device of the present disclosure, which is a gateway 100 in this embodiment, includes a main port 110, serial ports 120 (such as the serial ports 121, 122 and 123), a storage module 130 and a processing module 150.

The main port 110 is electrically connected to a main device 410. In general, the main port 110 is a serial port, that is, the main device 410 is a serial device, and the gateway 100 is electrically connected to the main device 410 through the serial port.

The main port 110 is configured to receive a request transmitted from the main device 410, and the request received by the main port 110 may include a piece of device identification data. The device identification data corresponds to a slave device 420, and is configured to represent the corresponding slave device 420. The device identification data may be formed by any quantity of texts, letters, numbers, and symbols in any arrangement. The present disclosure does not particularly limit the format of the device identification data, as long as the main device 410 may distinguish different slave devices 420 (such as slave devices 421, 422, 423 and so on) according to the device identification data.

The serial port 120 may be electrically connected to the slave device 420, and the serial ports 120 respectively correspond to different serial port identification data. The serial port identification data is configured to represent different serial port 120 and may be formed by any quantity of texts, letters, numbers, and symbols in any arrangement. The present disclosure does not no particularly limit the format of the serial port identification data, as long as the gateway 100 may distinguish different serial ports 120 (such as serial ports 121, 122, 123 and so on) according to the serial port identification data.

The storage module 130 is configured to store a routing rule which records a corresponding relationship between the serial port identification data corresponding to the serial port 120, and the device identification data corresponding to the slave device 420. The record of the serial port identification data and the device identification data corresponding thereto is called as routing data. The present disclosure does not particular limit the format of stored routing rule; for example, the routing rule may be a data sheet, a set of conditional judgments, and so on. Furthermore, the present disclosure does not particularly limit the storage manner of the routing rule; for example, the routing rule may be stored in a database or a file.

The processing module 150 is electrically connected to the main port 110, the serial ports 120 and the storage module 130. It is particularly to be noted that the processing module 150 is electrically connected to the main port 110, the serial ports 120 and the storage module 130 respectively, as shown in FIG. 1A; in practical application, the processing module 150 may be electrically connected to the main port 110, the serial ports 120, the storage module 130 and other devices (not shown in FIG. 1A) of the gateway 100 through a bus; however, the present disclosure is not limited thereto. The processing module 150 may receive data from the main port 110, the serial ports 120, the storage module 130 or other input/output device by a polling manner, or provide data to the main port 110, the serial ports 120, the storage module 130 or other input/output device. In some embodiments, the processing module 150 and the storage module 130 may be included in the same processing chip (not shown in FIG. 1A), and the processing module 150 and the storage module 130 may be electrically connected to each other through circuits of the processing chip, and the processing chip may be electrically connected to the main port 110, the serial ports 120 and other input/output devices through the bus; alternatively, the processing chip may be electrically connected to the main port 110, the serial ports 120 and other input/output devices, respectively.

The processing module 150 is configured to determine, according to the routing rule stored in the storage module 130, the serial port identification data corresponding to the device identification data of the request received by the main port 110. The processing module 150 may receive the device identification data contained in the request by only checking a header of the request received by the main port 110 without checking content of the request, and then determine the corresponding serial port identification data from the routing rule according to the received device identification data. In other words, when the gateway 100 is supportable to the request transmitted by the main device 410, the processing module 150 may determine the format or the protocol of the request, transmitted from the main device 410, and the processing module 150 may receive the device identification data from the request later. The present disclosure does not particularly limit the format or protocol used by the request.

When the serial port identification data corresponding to the device identification data of the request exists in the routing rule stored in the storage module 130 (that is, the routing rule records the serial port identification data corresponding to the device identification data of the request and the processing module 150 may receive the corresponding serial port identification data according to the device identification data contained in the request), the processing module 150 may forward the request, received from the main port 110, to the slave device 420 (such as the slave device 421, 422 or 423) corresponding to the device identification data of the request, through a serial port (such as the serial port 121, 122 or 123) corresponding to the received serial port identification data, and then wait for a response from the slave device 420 corresponding to the device identification data of the request. The response from the slave device 420 of the present disclosure corresponds to the request transmitted by the processing module 150 to the same slave device 420 through the serial port 120.

After a predetermined timeout period, if the processing module 150 does not receive the response from the slave device 420, which corresponds to the device identification data of the request, through the serial port 120 transmitting the request from the main port 110, the processing module 150 may delete a piece of routing data from the stored routing rule. The deleted routing data is indicative of the corresponding relationship between the device identification data contained in the request received by the main port 110, and the serial port identification data corresponding to the serial port transmitting the request. In other words, after the processing module 150 deletes the routing data, the routing rule does not record the serial port identification data corresponding to the device identification data contained in the request.

Furthermore, when the processing module 150 determines that the serial port identification data corresponding to the device identification data contained in the request does not exist in the routing rule stored in the storage module 130, the processing module 150 may respectively, through all serial ports 120, transmit the request received by the main port 110, and wait for any response, which corresponds to the transmitted request, from any slave device 420.

When the processing module 150 receives the response, which corresponds to the transmitted request, from any slave device 420 through the serial port 120 before the predetermined timeout period (that is, the processing module 150 receives the response, corresponding to the transmitted request, from any slave device 420 through the serial port 120), the processing module 150 may add a piece of transaction data as routing data in the routing rule stored in the storage module 130. The transaction data indicates a corresponding relationship between the device identification data of the request and the serial port identification data corresponding to the serial port receiving the response.

When the processing module 150 receives the response, corresponding to the transmitted request, within predetermined timeout period, the processing module 150 may forward the response to the main device 410 through the main port 110.

It is worth noting that when the processing module 150 receives more than two responses through the serial port 120 within the predetermined period (that is, more than two slave devices 420 transmit their responses to the gateway 100), the processing module 150 may generate a notice message indicative of collision between pieces of device identification data of a plurality of slave devices 420 without adding the transaction data in the routing rule stored in the storage module 130 and without transmitting the received responses to the main device 410 through the main port 110. Next, the processing module 150 may transmit the generated notice message to the main device 410 through the main port 110.

Figure 1B:
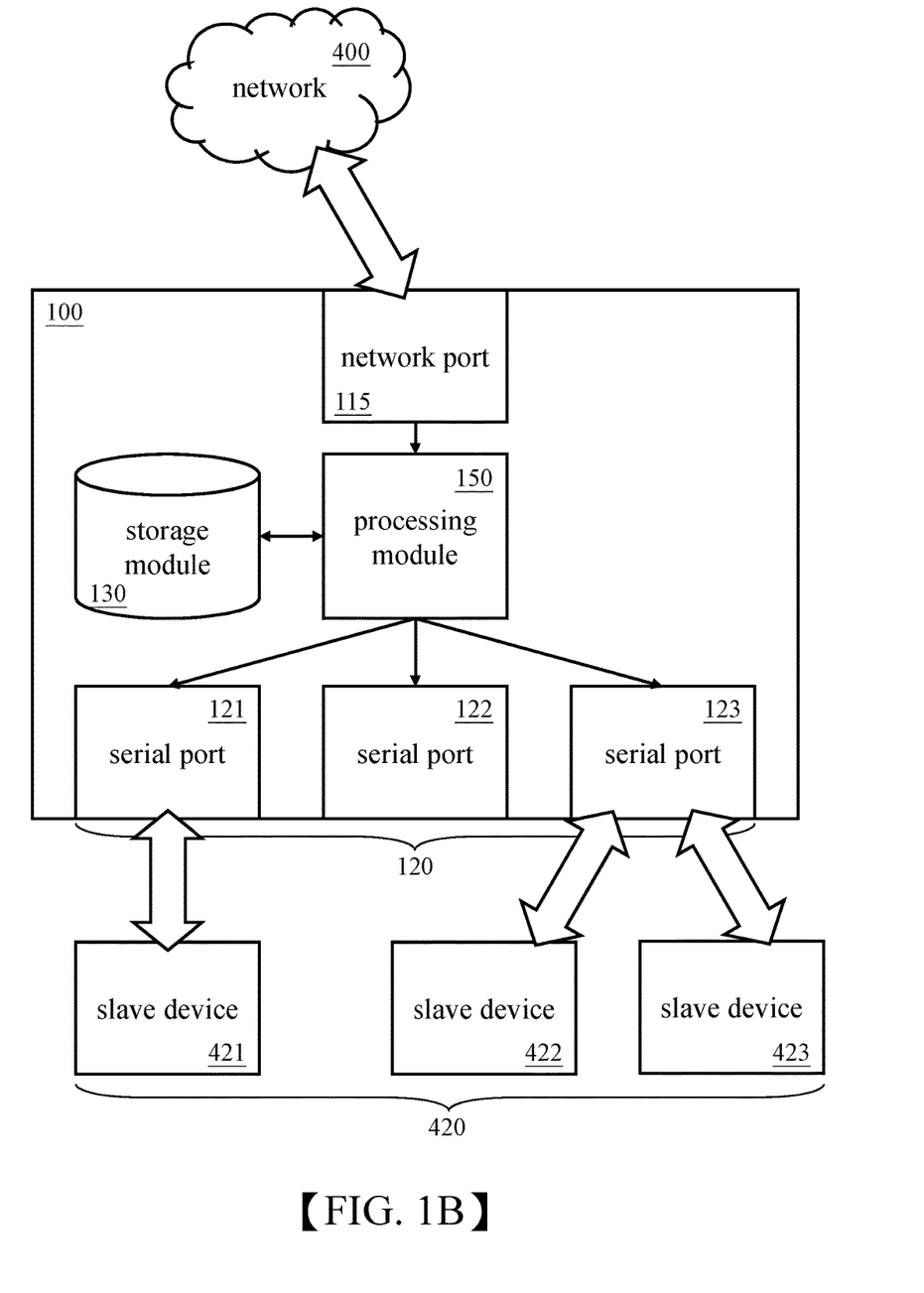
FIG. 1B is a schematic view of other embodiment of a device for maintaining serial routing during request transmission, in accordance with the present disclosure.

The following refer to FIG. 1B, which is a block diagram of other embodiment of a device for maintaining serial routing during request transmission, to illustrate operation process of the present disclosure. As shown in FIG. 1B, the gateway 100 of the present disclosure may include a network port 115, serial ports 120, a storage module 130 and a processing module 150. Functions of the serial ports 120 and the storage module 130 shown in FIG. 1B are the same as that of the serial ports 120 and the storage module 130 shown in FIG. 1A.

The network port 115 is electrically connected to the network 400 and configured to receive a communication packet transmitted from the network 400. Preferably, the network 400 of the present disclosure may be common communication network, such as internet network or Ethernet, or may be other networks used in industrial or other network using private protocol; however, the present disclosure is not no particularly limited to certain type of network.

In FIG. 1B, the processing module 150 is electrically connected to other devices of the gateway 100 in the same manner and connection relationship as the connection relationship between the processing module 150 and other devices of the gateway 100 (such as the serial ports 120 and the storage module 130) of FIG. 1A, and the processing module 150 has the same function as that of the processing module 150 of FIG. 1A, so its detail description is not repeated. However, in some embodiments, the processing module 150 may not include the function of receiving the request transmitted by the main device 410 through the main port 110 and transmitting the response and the notice message to the main device 410 through the main port 110, but the processing module 150 of FIG. 1A includes this function.

Furthermore, the processing module 150 may be configured to determine which slave device 420 is able to process content of the communication packet received through the network port 115, and generate the request containing the content of the communication packet and the device identification data of the determined slave device 420.

Figure 2A:
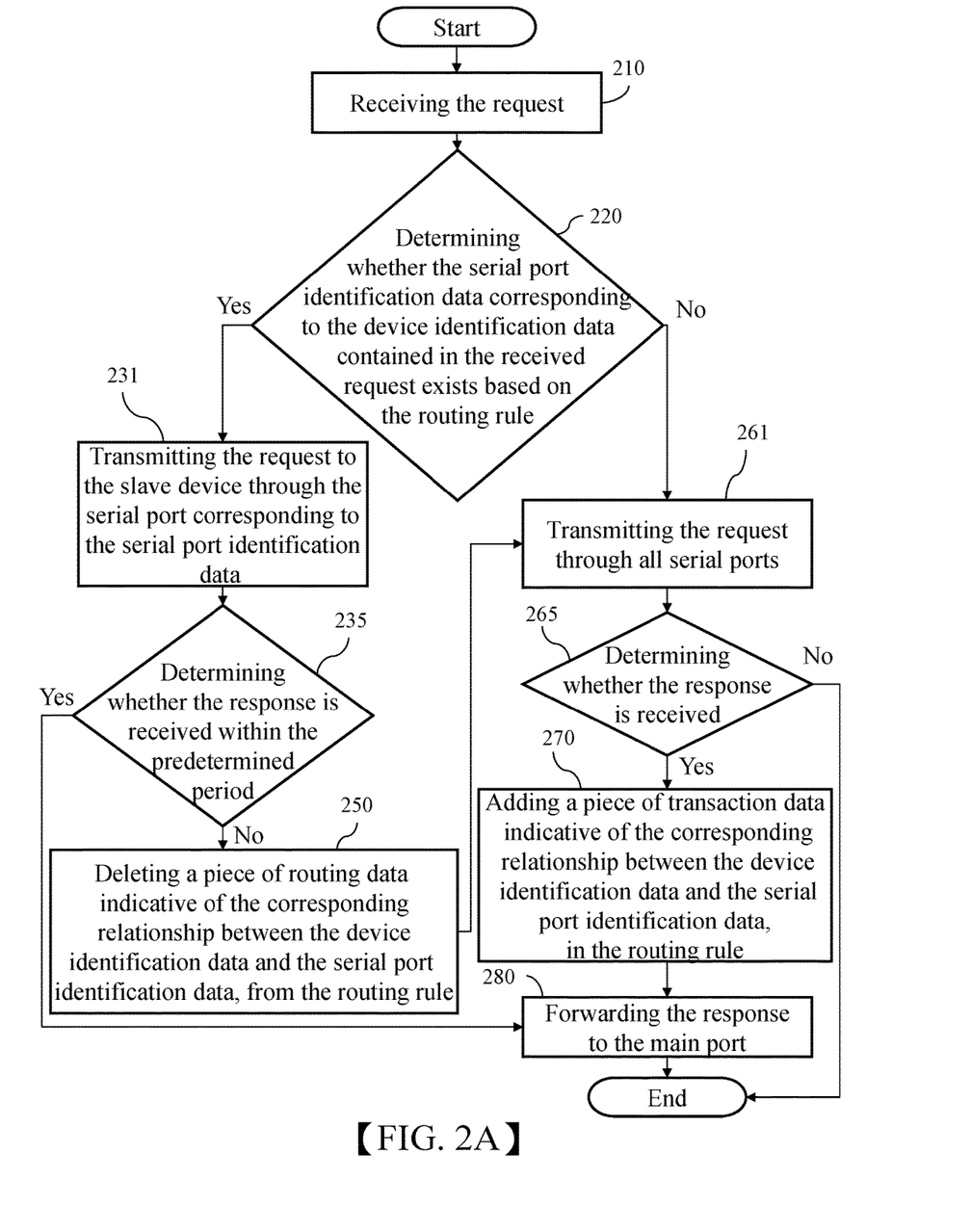
FIG. 2A is a flowchart showing the steps in an operation of a method for maintaining serial routing during request transmission, in accordance with the present disclosure.

The following refers to FIG. 2A, which is a flowchart showing the steps in an operation of a method for maintaining serial routing during request transmission, to illustrate an embodiment of the present disclosure. In this embodiment, suppose that the gateway 100 is electrically connected to the main device 410 through the main port 110, and electrically connected to a plurality of slave devices 420 through the serial ports 120 respectively. The device identification data corresponding to the slave device 421 is "1", the device identification data corresponding to the slave device 422 is "2", and the device identification data corresponding to the slave device 423 is "3".

In order to transmit the request, received from the main device 410, to the slave device 422 through the gateway 100, the main port 110 of the gateway 100 may receive the request transmitted from the main device 410; and in this embodiment, the device identification data contained in the request transmitted by the main device 410 is "2".

Figure 3A:
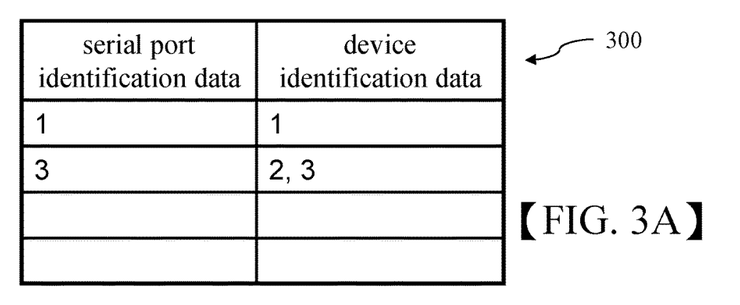
FIGS. 3A-3C are schematic views show change of the routing data in a routing table of the embodiment of the present disclosure.

After the main port 110 of the gateway 100 receives the request transmitted from the main device 410 (step 210), the processing module 150 of the gateway 100 may determine whether the serial port identification data corresponding to the device identification data contained in the received request exists based on the routing rule stored in the storage module 130 of the gateway 100 (step 220). In this embodiment, suppose that routing rule is performed by a routing table 300 which records a corresponding relationship between the device identification data and the serial port identification data, as shown in FIG. 3A.

When the processing module 150 of the gateway 100 determines that the serial port identification data corresponding to the device identification data contained in the request exists in the routing rule stored in the storage module 130 of the gateway 100, the processing module 150 may transmit the request, which is received by the main port 110 of the gateway 100, to one of the slave devices 420 through the serial port 120, which corresponds to the serial port identification data corresponding to the device identification data (step 231), and the processing module 150 then waits for the response from the slave device 423. In this embodiment, the device identification data contained in the request is "2", so the processing module 150 may determine that the serial port identification data corresponding to the device identification data "2" is "3" according to the routing table 300, and when the serial port 123 corresponds to the serial port identification data "3", the processing module 150 may transmit the request through the serial port 123.

After the processing module 150 of the gateway 100 transmits the request through the serial port 120 of the gateway 100, the slave device 420 electrically connected to the serial port 120, which transmits the request, may receive the transmitted request. According to existing serial communication protocol, such as Modbus protocol, when receiving the communication packet, the slave device 420 must check whether the device identification data contained in the received communication packet corresponds thereto, that is, the slave device 420 may check whether the device identification data contained in the received communication packet is equal to the device identification data used by itself; if no, the slave device 420 may drop the received communication packet; if yes, the slave device 420 may transmit the response packet to the device transmitting the packet. In this embodiment, both of the slave devices 422 and 423, which are electrically connected to the serial port 123, may receive the request transmitted from the serial port 123, but the device identification data corresponding to the slave device 423 is "3" which is different from the device identification data "2" contained in the received request, so that the slave device 423 drops the received request and may not transmit the response to the gateway 100. The device identification data corresponding to the slave device 422 is "2" and the same as the device identification data "2" contained in the received request, so the slave device 422 may transmit the response to the gateway 100.

Similarly, after the processing module 150 of the gateway 100 transmits the request through the serial port 120 of the gateway 100, the processing module 150 may wait for the response, which is transmitted by the slave device 420 corresponding to the request, through the serial port 120 transmitting the request. In a step 235, the processing module 150 may determine whether the response corresponding to the transmitted request is received within the predetermined period. In this embodiment, the processing module 150 may determine whether the serial port 123 receives the response transmitted from the slave device 422 within the predetermined period.

If the serial port 120 of the gateway 100, which transmits the request, receives the response, which corresponds to the transmitted request and is transmitted by the slave device 420, within the predetermined period, the processing module 150 of the gateway 100 may forward the response, which is received by the serial port 120, to the main device 410 through the main port 110. In this embodiment, in a step 280, when the processing module 150 determines that the serial port 123 receives the response from the slave device 422 within the predetermined period, the processing module 150 may transmit the response, which is transmitted by the slave device 422, to the main device 410 through the main port 110.

Figure 3B:
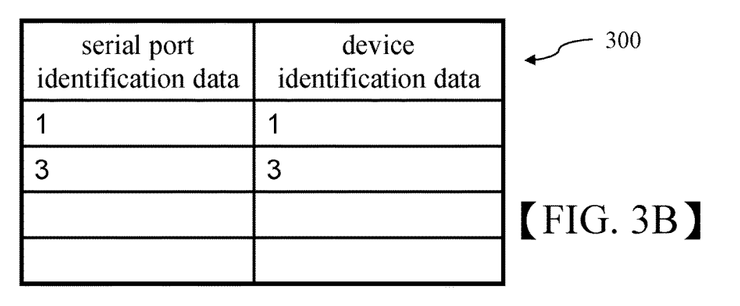

After the predetermined period, if the processing module 150 of the gateway 100 does not receive the response, which corresponds to the request and is transmitted by the slave device 420, from the serial port 120 which has transmits the request, the processing module 150 may delete a piece of routing data indicative of the corresponding relationship between the device identification data contained in the request and the serial port identification data corresponding to the serial port which transmits the request, from the routing rule stored in the storage module 130 of the gateway 100 (step 250). In this embodiment, the routing data indicative of the corresponding relationship between the device identification data "2" and the serial port identification data "3" is deleted from the routing table 300; as a result, there is no serial port identification data corresponding to the device identification data "2" in the routing table 300, and the serial port identification data "3" only corresponds to the device identification data "3", as shown in FIG. 3B.

Furthermore, in the step 220, the processing module 150 of the gateway 100 may determine whether the serial port identification data corresponding to the device identification data contained in the request exists based on the routing rule stored in the storage module 130 of the gateway 100. In a step 261, if the processing module 150 of the gateway 100 determines that the serial port identification data corresponding to the device identification data contained in the request does not exist in the routing rule stored in the storage module 130 of the gateway 100, the processing module 150 may respectively transmit the request, which is received through the main port 110 of the gateway 100, to all serial ports 120 through the gateway 100, and then wait for any response transmitted from any one of the slave devices 420.

After the step 261, the processing module 150 of the gateway 100 respectively transmits the request through all serial ports 120 of the gateway 100, all slave devices 420 electrically connected with the gateway 100 may receive the request. As mentioned previously, according to existing serial communication protocol, when receiving the communication packet, if the slave device 420 determines that the device identification data contained in the communication packet corresponds thereto, the slave device 420 may transmit the response packet to the device which transmits the communication packet. In this embodiment, the device identification data contained in the request is "2", if the slave device 422 corresponding to the device identification data "2" is not electrically connected to the gateway 100 and no other slave device 420 corresponds to the device identification data "2", it indicates that no slave device 420 transmits the response to the gateway 100. In other words, the processing module 150 may not receive any response after transmitting the request through all serial ports 120 (the step 261); next, in a step 265, when the processing module 150 determines absence of the response after the predetermined timeout period, the processing module 150 terminates the request process procedure.

Figure 3C:
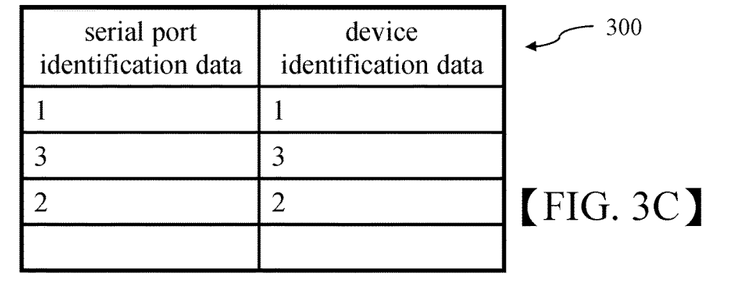

In other case, under a condition that the gateway 100 is operating without being restarted and the slave device 422, which corresponds to the device identification data "2" and is electrically connected to the serial port 123 of the gateway 100 originally, is changed to electrically connect to the serial port 122 (for example, the user changes the serial port through which the slave device 422 is electrically connect to the gateway 100), after the processing module 150 of the gateway 100 transmits the request through all serial ports 120 of the gateway 100 (the step 261), the slave device 422 may receive the request, which is transmitted from the processing module 150, though the serial port 122 connected thereto, and the slave device 422 may transmit the response to the gateway 100, so that the processing module 150 receives the response, which corresponds to the request and is transmitted from the slave device 422, through the serial port 122. As a result, in a step 265, the processing module 150 of the gateway 100 may determine whether the response is received; and then in a step 270, the processing module 150 may add a piece of transaction data in the routing rule stored in the storage module 130 of the gateway 100, and the added transaction data indicates a corresponding relationship between the device identification data contained in the request and the serial port identification data corresponding to the serial port which receives the response. In this embodiment, the processing module 150 may add the piece of transaction data, which indicates the corresponding relationship between the device identification data "2" and the serial port identification data "2" in the routing table 300, as new routing data. As a result, the routing table 300 may record three pieces of routing data, which respectively indicate corresponding relationships between device identification data "1" and the serial port identification data "1", the device identification data "2" and the serial port identification data "2", and the device identification data "3" and the serial port identification data "3", as shown in FIG. 3C.

Similarly, in a step 280, after the processing module 150 of the gateway 100 determines that the serial port 120 of the gateway 100 receives the response (the step 265), the processing module 150 may forward the response, which is received by the serial port 120, to the main device 410 through the main port 110.

Figure 2B:
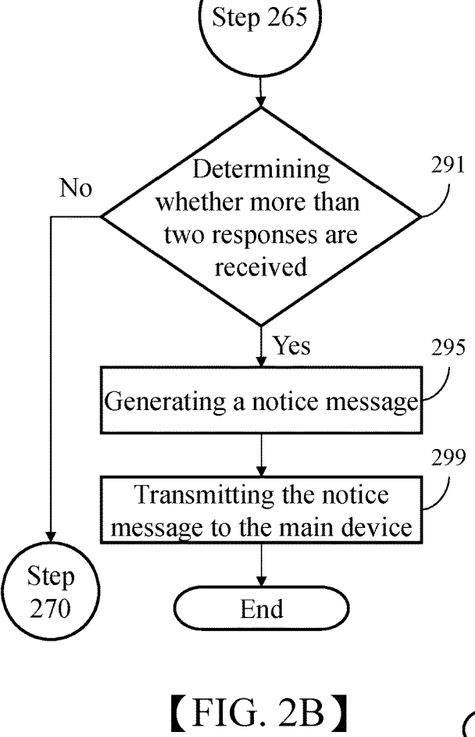
FIG. 2B is a flowchart showing the steps of processing multiple received responses, in accordance with the method of the present disclosure.

In aforementioned embodiment, in a step 291, after the processing module 150 of the gateway 100 transmits the request through all serial ports 120 of the gateway 100 (the step 261), the processing module 150 may continuously determine whether more than two responses are received within the predetermined timeout period; and if the processing module 150 receives only one response within the predetermined timeout period, the processing module 150 may add the piece of transaction data indicative of the corresponding relationship between the device identification data and the serial port identification data in the routing rule (as aforementioned step 270), and then transmits the received response to the main device 410 (the step 280). In a step 295, if processing module 150 receives two or more responses within the predetermined timeout period, the processing module 150 may not add the transaction data and not forward the response, but generate a notice message and then in a step 299, the processing module 150 may transmit the generated notice message to the main device 410 through the main port 110 of the gateway 100.

In the aforementioned embodiment, after the processing module 150 deletes, from the routing rule stored in the storage module 130 of the gateway 100, the routing data indicative of the corresponding relationship between the device identification data and the serial port identification data (the step 250), the processing module 150 may terminate the process procedure for the packet or continuously transmit the request through all serial ports 120 (the step 261), and then execute aforementioned steps sequentially. The present disclosure does not particularly limit the operation of the processing module 150 after the step 250.

Figure 2C:
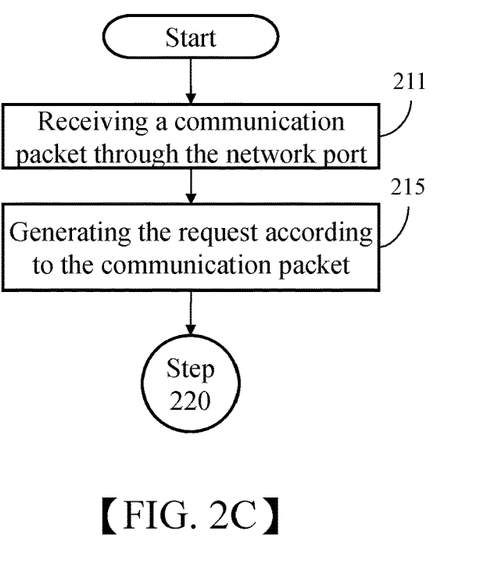
FIG. 2C is a flowchart showing the steps of receiving the request, in accordance with the method of the present disclosure.

Furthermore, under a condition that the gateway 100 is electrically connected to the network 400 directly through the network port 115 (such as the embodiment of FIG. 1B), after the gateway 100 receives the communication packet through the network port 115 (the step 211), the gateway 100 may generate the request containing the device identification data according to the received communication packet (in a step 215), thereby receiving the request (the step 210 of FIG. 2A). Next, the gateway 100 may operate based on the flows shown in FIG. 2A, and after the processing module 150 of the gateway 100 deletes the routing data indicative of the corresponding relationship between the device identification data and the serial port identification data (the step 250) and the processing module 150 then adds the transaction data indicative of the corresponding relationship between the device identification data and the serial port identification data (the step 270), the gateway 100 may directly terminate the packet processing procedure without forwarding the received response to the non-existent main device 410. Similarly, after the processing module 150 generates the notice message, the processing module 150 may directly display the notice message on the gateway 100 without transmitting the generated notice message to non-existent main device 410.

To summarize, the difference between the present disclosure and the conventional technology is that the gateway of the present disclosure may delete the corresponding routing data then transmit the request through all serial ports when the gateway has transmitted the request according to the routing rule but did not receive the response, and then add the corresponding transaction data in the routing rule, thereby solving the conventional technology problem that, when a new serial device is added to connect to the gateway or the serial device is re-connect to different serial port of the gateway, the routing rule must be updated manually to prevent that the new serial device or changed the serial device is unable to transmit and receive data correctly. As a result, the technical effect that it is not necessary for the user to particularly set the gateway after installation may be achieved.

Furthermore, the method for maintaining the serial routing during request transmission may be implemented by hardware, software or a combination thereof, and may be implemented by centralized computer system or different devices distributed in interconnected computer systems.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A method for maintaining a serial routing during request transmission, wherein the method is applicable to a gateway which comprises a plurality of serial ports, and the method comprises:

receiving a request which comprises device identification data;

determining whether serial port identification data corresponding to the device identification data exists based on a routing rule;

under a condition that the serial port identification data exists in the routing rule, transmitting the request through one of plurality of serial ports corresponding to the serial port identification data, and waiting for a response, and then deleting a piece of routing data indicative of a corresponding relationship between the device identification data and the serial port identification data, from the routing rule when the response is not received after a predetermined period; and under a condition that the serial port identification data does not exist in the routing rule, transmitting the request through all of the plurality of serial ports respectively and waiting for the response, and then adding a piece of transaction data indicative of a corresponding relationship between the device identification data and other serial port identification data, in the routing rule when the response is received, wherein the other serial port identification data corresponds to the serial port receiving the response.

2. The method according to claim 1, after the step of transmitting the request through the serial ports respectively, further comprising:

generating a notice message upon receipt of the at least two responses.

3. The method according to claim 1, wherein the step of receiving the request comprises:

receiving the request transmitted from a main device, or receiving a communication packet through a network port of the gateway to generate the request according to the communication packet.

4. The method according to claim 1, after the step of waiting for the response, further comprising:

forwarding the response to the main device after the response is received within the predetermined period.

5. The method according to claim 1, after the step of deleting the routing data indicative of the corresponding relationship between the device identification data and the serial port identification data, further comprising:

transmitting the request through the serial ports respectively and waiting for the response; and adding the transaction data indicative of the corresponding relationship between the device identification data and the other serial port identification data, in the routing rule when the response is received.

6. A device for maintaining serial routing during request transmission, comprising:

a main port electrically connected to a main device, and configured to receive a request transmitted from the main device, and the request comprising device identification data;

a plurality of serial ports, and each of the plurality of serial ports corresponding to a piece of serial port identification data;

a storage module configured to store a routing rule; and a processing module electrically connected to the main port, the plurality of serial ports and the storage module, and configured to determine whether the piece of serial port identification data corresponding to the device identification data exists based on the routing rule, and wherein when the piece of serial port identification data exists in the routing rule, the processing module transmits the request through the serial port corresponding to the piece of serial port identification data and waits for a response, and when the processing module does not receive the response after a predetermined period, the processing module deletes a piece of routing data indicative of a corresponding relationship between the device identification data and the piece of serial port identification data, from the routing rule;

wherein when the piece of serial port identification data does not exist in the routing rule, the processing module transmits the request through the plurality of serial ports respectively and waits for the response, and when the processing module receives the response, the processing module adds a piece of transaction data indicative of the corresponding relationship between the device identification data and other piece of serial port identification data, in the routing rule, and the other piece of serial port identification data corresponds to one of the plurality of serial ports which receives the response.

7. The device according to claim 6, wherein when the processing module receives at least two responses through the plurality of serial ports, the processing module generates a notice message and transmits the notice message to the main device through the main port.

8. The device according to claim 6, wherein when the processing module receives the response through the plurality of serial ports within the predetermined period, the processing module forwards the response to the main device through the main port.

9. The device according to claim 6, wherein when the processing module does not receive the response after the predetermined period, the processing module transmits the request through the plurality of serial ports respectively and waits for the response, and when the processing module receives the response, the processing module adds the piece of transaction data indicative of the corresponding relationship between the device identification data and the other serial port identification data, in the routing rule.

10. A device for maintaining serial routing during request transmission, comprising:

a network port configured to receive a communication packet;

a plurality of serial ports, and each of the plurality of serial ports corresponding to a piece of serial port identification data;

a storage module configured to store a routing rule; and a processing module electrically connected to the network port, the plurality of serial ports and the storage module, and configured to generate a request, which comprises device identification data, according to the communication packet, and configured to determine whether a piece of serial port identification data corresponding to the device identification data exists based on the routing rule, and wherein when the piece of serial port identification data exists in the routing rule, the processing module transmits the request through one of the plurality of serial ports corresponding to the piece of serial port identification data and waits for a response, and when the processing module does not receive the response after a predetermined period, the processing module deletes a piece of routing data indicative of a corresponding relationship between the device identification data and the piece of the serial port identification data, from the routing rule;

wherein when the piece of serial port identification data does not exist in the routing rule, the processing module transmits the request through the plurality of serial ports respectively and waits for the response, and when the processing module receives the response, the processing module adds a piece of transaction data indicative of a corresponding relationship between the device identification data and other piece of serial port identification data, in the routing rule, and the other piece of serial port identification data corresponds to one of the plurality of serial ports receiving the response.

11. The device according to claim 10, wherein when the processing module receives at least two responses through the plurality of serial ports, the processing module generates a notice message.

12. The device according to claim 10, wherein when the processing module does not receive the response after the predetermined period, the processing module transmits the request through the plurality serial ports respectively and waits for the response, and after the processing module receives the response, the processing module adds the piece of transaction data indicative of the corresponding relationship between the device identification data and the other piece of serial port identification data, in the routing rule.

* * * * *